United States Patent
Carroll et al.

(10) Patent No.: US 6,327,630 B1
(45) Date of Patent: Dec. 4, 2001

(54) ORDERED MESSAGE RECEPTION IN A DISTRIBUTED DATA PROCESSING SYSTEM

(75) Inventors: Jeremy John Carroll, Leghorn (IT); Andrei Vladilenovich Borshchev, St. Petersburg (RU)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/043,405

(22) PCT Filed: Jul. 24, 1997

(86) PCT No.: PCT/GB97/02006

§ 371 Date: Apr. 5, 1999

§ 102(e) Date: Apr. 5, 1999

(87) PCT Pub. No.: WO98/03910

PCT Pub. Date: Jan. 29, 1998

(30) Foreign Application Priority Data

Jul. 24, 1996 (GB) .................................................. 9615532
Oct. 22, 1996 (GB) .................................................. 9621947

(51) Int. Cl.$^7$ ............................... G06F 9/00; G06F 9/46; G06F 15/16; H04L 12/50
(52) U.S. Cl. ......................... 709/314; 709/103; 709/100; 709/207; 370/412
(58) Field of Search .................................. 709/300, 205, 709/207, 201, 100, 310, 228, 227; 714/4; 710/263, 34, 100, 106; 707/4; 370/401, 412, 312

(56) References Cited

U.S. PATENT DOCUMENTS

| | | | |
|---|---|---|---|
| 4,725,834 | * 2/1988 | Chang et al. | 340/825.5 |
| 4,930,124 | * 5/1990 | Boisseron et al. | 370/400 |
| 4,952,930 | * 8/1990 | Franaszek et al. | 340/825.8 |
| 5,396,613 | * 3/1995 | Hollaar | 714/4 |
| 5,544,316 | * 8/1996 | Carpenter et al. | 709/300 |
| 5,664,190 | * 9/1997 | Cohen et al. | 709/100 |

OTHER PUBLICATIONS

*Programming with Process Groups: Group and Multicast Semanticst*, by Birman et al., TR–91–1185, Jan. 29, 1991, pp. 1–23.
*Logical Time in Distributed Computing Sytems*, by Colin Fidge, 1991, pp. 28–33.
*Time, Clocks, and the Ordering of Evens in a Distributed System*, by Leslie Lamport, Jul., 1978, vol. 21, No. 7, pp. 558–565.
*An Implementation of Flush Channels Based on a Verification Methodology*, Kearns, et al., 1992, pp. 336–343.
*Lightweight Casual and Atomic Group Multicast*, by Birman et al., May 27, 1991, pp. 1–49.
*Virtual Time and Global States of Distributed Systems*, by Mattern, 1989, pp. 215–226.
*Distributed Algorithms: Their Nature & The Problems Encountered*, by Raynal, 1989, pp. 179–185.
*Exploiting Locality in Maintaining Potential Causality*, by Meldal et al., 9 pages.
*Reliable Communication in the Presence of Failures*, by Birman et al., TR 85–694, Jul. 1985, pp. 1–41.

(List continued on next page.)

Primary Examiner—Kevin J. Teska
Assistant Examiner—William Thomson

(57) ABSTRACT

A complex computing system has a plurality of nodes interconnected by channels through which data messages are exchanged. The underlying principle is that after arrival at a node of a message, delivery of that message is delayed until after delivery and consequences of all more senior messages which affect the node. The messages are progressively timestamped at each node so that each time stamp contains generation by generation indicators of the origin of the associated message. The seniority of that message is uniquely determined thereby and total ordering of the messages can be achieved. When comparing timestamps for such ordering, comparison of respective generation indicators is necessary only until there is a distinction.

11 Claims, 6 Drawing Sheets

OTHER PUBLICATIONS

*XP 000614859 Virtual Time,* by David R. Jefferson, Jul.,n 1985, pp. 404–425.

"The REXX Language A Practical Approach to Programming", Cowlishaw, IBM, 1985. Selected pages.*

* cited by examiner

ORDERED MESSAGE RECEPTION IN A DISTRIBUTED DATA PROCESSING SYSTEM

This invention relates to complex computing systems. It was developed primarily to answer a problem with distributed systems, but it has been realised that it is equally applicable to systems which, are not normally considered to be distributed, such as a multi-processor computer. Although their physical separation may be negligible, nonetheless the processors are distinct and form a "distributed" system within the computer to which this invention is applicable.

A landmark paper on distributed systems is that of Lamport ("Time, Clocks and the Ordering of Events in a Distributed System"—Communications of the ACM Vol. 21 No. 7, 1978 pp 558–565). In that, a distributed system is defined as a collection of distinct processes which are spatially separated and which communicate with one another by exchanging messages, and in which the message transmission delay is not negligible compared to the time between events in a single process. In such a system, it is sometimes impossible to say that one of two events occurred first, Lamport proposed a logical clock to achieve a partial ordering of all the events, and he postulated a single integer timestamp on each message, corresponding to the time the message was sent.

Fridge (in "Logical Time in Distributed Computing Systems"—IEEE Computer 24(8) August 1991 pp 28–33) argued that the time stamps of Lamport clocks (totally ordered logical clocks) impose on unrelated concurrent events an arbitrary ordering, so that the observer cannot distinguish from genuine causal relationships. He proposed partially ordered time readings and timestamping rules which enable a causal relationship between two events to be established. Their order could then be determined. But where there is no causal relationship between events, no definitive order exists, and different total orderings of events (or interleavings) are possible. This means that some messages are assigned an arbitrary order.

This ordering problem is known as the "race condition problem" and it can be illustrated by a simple analogy. A dictates a first message to secretary B, who faxes the typed version to C. A telephones C with a second message. Unless ordered, the communication system will not know whether the first or second message reached C first, although it will know that the dictation preceded the fax.

It is the aim of this invention to resolve this problem and to allow someone to programme a distributed system as if he was programming a uni-processor. In other words, he can think about time linearly and he will not have to be concerned about concurrency or the race condition problem.

According to one aspect of the present invention there is provided a complex computing system comprising a plurality of nodes connected to each other by channels along which timestamped data messages are sent and received, each timestamp being indicative, generation by generation, of its seniority acquired through its ancestors, arrival in the system and in any upstream nodes, and each node comprising: means; for storing each input data message, means for determining the seniority of input data messages by progressive comparison of respective generations in the timestamps until the first distinction exists, means for delivering these messages for processing, means for applying a timestamp to each output message derived from such processing comprising the immediately ancestral message's timestamp augmented by a new generation seniority indicator consistent with the ordering, and means for outputting such ordered and timestamped messages.

The delivery means will generally be arranged to deliver messages in order according to which message has the most senior timestamp indicator.

For a data message received from outside the system the initial timestamp indicator will preferably include an indication of the time of receipt of said data message at the node, while for a data message generated by a node of the system the new generation seniority indicator of the timestamp will preferably include an indication of the place of said data message in the ordered sequence of such messages at said node. This indication may be real time or logical time.

Conveniently, monotonic integers are utilised as said generation seniority indicators in the timestamps.

Advantageously, the delivery means of a node delivers data messages only either once a message has been received on each of the input channels of said node or when at least one data message received on each of the input channels of said node is stored in the storage means.

Preferably each node will be adapted to perform at least one channel flushing routine triggerable by lack or paucity of channel traffic.

Ideally, all data messages caused by a first data message anywhere in the system will be delivered to a node before any messages caused by a second data message, junior to the first data message, are delivered to said node.

According to another aspect of the present invention there is provided a method of ordering data messages within a complex computing system comprising a plurality of nodes connected to each other by channels along which data messages are sent and received, the method comprising, for each node, timestamping each message on arrival, queuing messages until a message has been received on each input channel to the node, and delivering the queued messages for processing sequentially in accordance with their timestamps, the message having the most senior timestamp being delivered first, wherein the timestamping at each node is cumulative so that the timestamp of a particular message indicates the seniority acquired by that message, generation by generation, and wherein the seniority of one message against another is determined by the progressive comparison of respective generations in the timestamps until the first distinction exists.

According to a further aspect of the present invention there is provided a complex computing system comprising a plurality of nodes between which data messages are exchanged, wherein after the arrival at a node of a message, delivery of the message by the node is delayed until after the delivery and consequences of all more senior messages which affect the node.

Such a system may be either a distributed computing system, a symmetric multi-processor computer, or a massively parallel processor computer.

Assumiptions

To understand later explanations, certain assumptions about a distributed computing system will be set out.

Such a system is a set of nodes or processes connected by FIFO (first in, first out) channels. Conventionally, 'nodes' refer to the hardware and 'processes' to the software and operations performed at the nodes, but the terms may be used interchangeably here. Some of these processes have external channels through which they communicate with the system's environment, the whole system being driven by input messages through some external channels, and sending out an arbitrary number of consequential output messages through other external channels.

Each process can be regarded as an application layer and a presentation layer, which handle the following events:

(a) Message arrival (at the presentation layer)

(b) Message delivery (from presentation to application layer)

(c) Message send request (from application to presentation layer)

(d) Message send (from presentation layer)

(e) Message processing complete (from application to presentation layer).

At any event (b), the application layer i) generates one or more events (c)

ii) changes the process state, and iii) generates event (e)—which indicates that it is ready to receive a further message.

A set of such events will be termed a message handler invocation. Such invocations are the basic building blocks or atomic units of a distributed system, and a process history is a sequence of such invocations. Each invocation may affect subsequent invocations by changing the internal state of the process.

At the application layer, the channels are simplex. However, auxiliary messages, from one presentation layer to the other, are allowed in both directions.

There will be a global real-time clock, accessible from anywhere in the system. It is required only to be locally monotonic increasing, and there will be some bound on the difference between two simultaneous readings on the clock in different processes.

The FIFO channels are static.

Processes do not generate messages spontaneously.

Each message in the system has exactly one destination.

(These last three assumptions are working hypotheses which will be relaxed later).

Finally, for initial consideration, there are no loops in the possible dataflows. This will be discussed further below.

The Time Model

The aim is to achieve a total ordering of the set of messages in the system. If messages are delivered to every process in time order and messages are sent along every channel in time order then the system is said to obey "the time model". A total ordering of the set of messages is equivalent to an infective mapping from the set of messages in the system to a totally ordered set (the time-line).

In this specification "<" will signify, in the relationship $m_p < m_q$, that message $m_p$ precedes message $m_q$ in the total order. This gives the first principle of the time model: there is a unique time for everything. Such a time is simply a label useful for evaluating the time order relationiship between messages, and does not have any necessary relationship with real time.

The relation "<" is based on two partial order relatioins, "⇒", (sent before) and "→" (strong causality), as explained below.

For any two external input messages, $m_0$ and $m_1$, either $m_0 \Rightarrow m_1$ or $m_1 \Rightarrow m_0$. This is given by the environment, typically by the clock time of message arrival. In other words, external input messages are totally ordered with respect to ⇒.

If message send requests for messages $m_0$ and $m_1$ occur during the same invocation at the behest of some third message, the send request for $m_0$ being before $m_1$, then $m_0 \Rightarrow m_1$.

"→" is the least partial order such that if the message send request for $m_1$ occurs during the invocation in response to $m_0$, then $m_0 \rightarrow m_1$. (i.e. a message strongly causes any messages sent by its handler).

The total order relation "<" is determined by the following axioms:

If $m_0 \Rightarrow m_1$ then $m_0 < m_1$.

If $m_0 \rightarrow m_1$ then $m_0 < m_1$.

If $m_0 \Rightarrow m_1$, $m_0 \rightarrow m'_0$ then $m'_0 < m_1$.

The first two axioms correspond to Lamport's axioms; the third, the strong causality axiom, is the heart of the time model of the present proposal.

The idea behind the strong causality axiom is the following: if a process or the system's environment sends two messages ($m_0$ and $m_1$), one after another, then any consequence ($m'_0$) of the first message ($m_0$) should happen before the second message ($M_1$) and any of its consequences.

This gives the second principle of the time model: there is enough time for everything (i.e. enough time for all remote consequences to happen before the next local event).

For a better understanding of the invention reference will now be made, by way of example, with reference to the accompanying drawings, in which.

Figure 1:
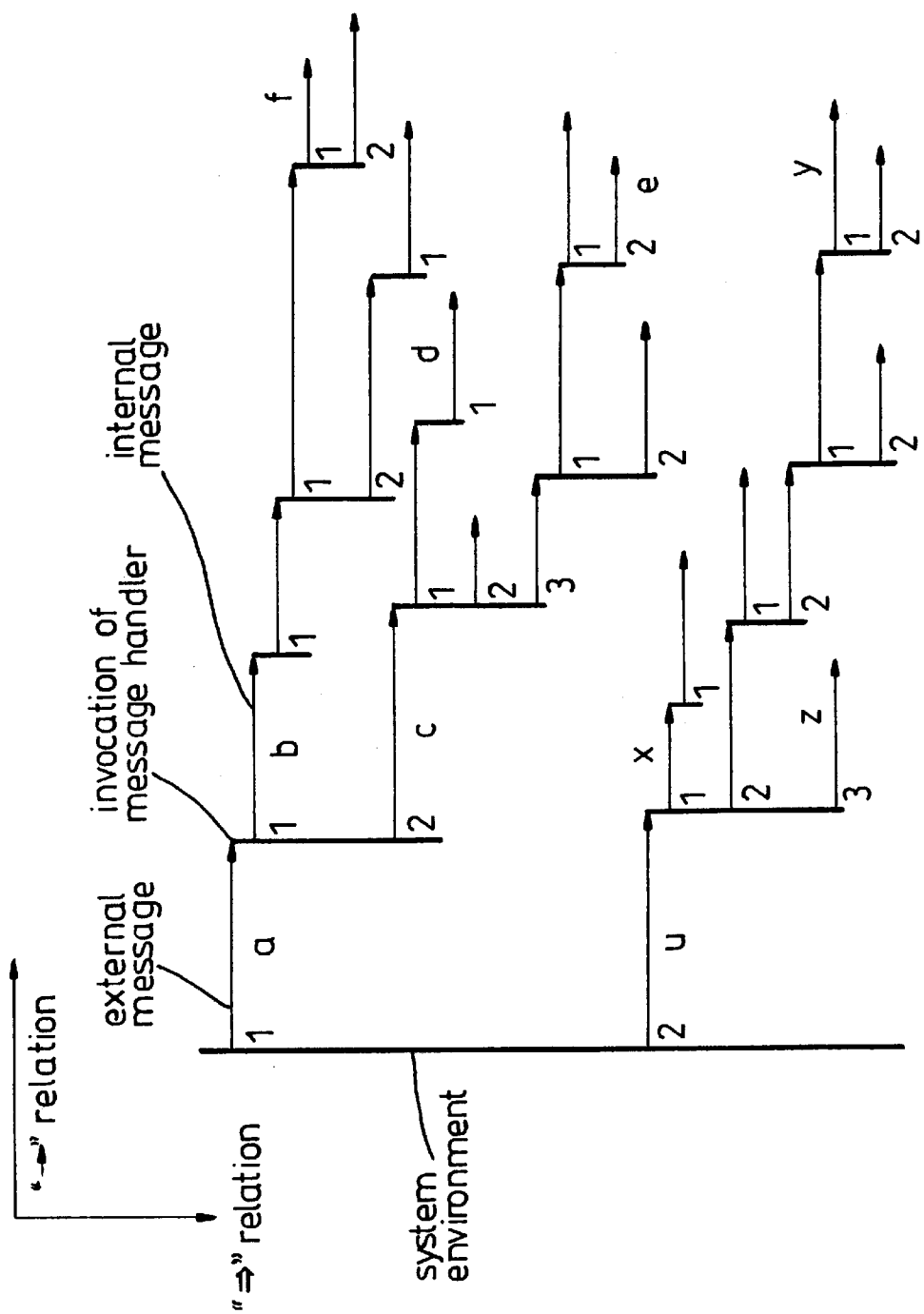
FIG. 1 is a diagram illustrating the total ordering of messages.

Referring to FIG. 1, the diagram can be likened to a tree on its side with its root (to the left) representing the system's environment which generates external messages. The nodes (the vertical lines) are message handler invocations and the arrowed horizontal lines represent messages.

Using this tree it is easy to reconstruct the message relations. For example, a→b because b was sent while a was handled; b⇒c because b was sent before c in the same invocation. Also, a→f and x⇒z as these relations are transitive. f and e are incomparable under both "⇒" and "→"; nevertheless f<e. To compare two messages with respect to the total order relation "<" one has to trace paths from the root to these messages. There can be three possible cases, which correspond to the three axioms. They are shown by the following three examples taken from FIG. 1:

c lies on the path of d, hence, c→d and therefore c<d.

x and z have the same path, but x is sent before z, so x⇒z and x<z.

f and e have the same path prefix, but then their paths fork, and b (with b→f) is sent before c (with c→e) which means b⇒c, so f<c<e, giving f<e.

If a distributed system follows this time model, i.e. if messages are delivered to each process in this order, and sent down each channel in this order, then the system's behaviour will be deterministic, independent of the speed of processes and channels.

A possible time-line from which each message can be given a unique time is the set of sequences of integers. These are ordered using the standard dictionary ordering.

The path from the root to a message fully identifies the message position in the total order relation "<". This path can be codified as a representation of time in the distriLbuted system. The names of processes along the path are immaterial the only information needed is the relative order of the message ancestors at each process and the order of the initial external messages. So, in FIG. 1, the time can be represented by an array of integers, e.g. [1,2,3,1,2] for e, [2,3] for z, [2,2,2,1,1] for y. However, since the system's environment may be distributed, it could be difficult to assign unique integers to each external message. A possible solution is to use real clock values combined with an external input identifier, this requiring that at every external input all real clock readings are unique and grow monotonically.

The following C++ class can be used for time:

```
class TTime (                              friend TTime bool operator<( TTime t0, TTime t1 ) {
public:                                       if( t0.RealClock < t1.RealClock) return TRUE;
  TTime():                                    if( t1.RealClock < t0.RealClock ) return FALSE;
    RealClock( 0.0 ),                         if( t0.Input < t1.Input ) return TRUE;
    Input( 0 ),                               if( t1.Input < t0.Input ) return FALSE;
    Length(0) {}                              for( unsigned i=0; i<min ( t0.Length, t1.Length ); i++ ) {
  TTime( float realclock, unsigned input ):     if(t0.Path[i] < t1.Path[i] return TRUE;
    RealClock( realclock ),                     if( t1.Path[i] <t0.Path[i] ) return FALSE;
    Input( input ),                           }
    Length(0) {}                              return t0.Length < t1.Length;
  void AddNewProcess{}                      }
    {Path[ Length++ ] = 0;}
  void operator++() { Path[Length-1]++; }
  friend bool operator<( TTime t0, TTime t1 );
private:
  float RealClock;
  unsigned Input;
  unsigned Path[ MAX_PATH ];
  unsigned Length;
```

The more processes handle a message, the longer its path grows. Potentially, if there is a cycle in the system, paths can become arbitrarily long.

Figure 2:
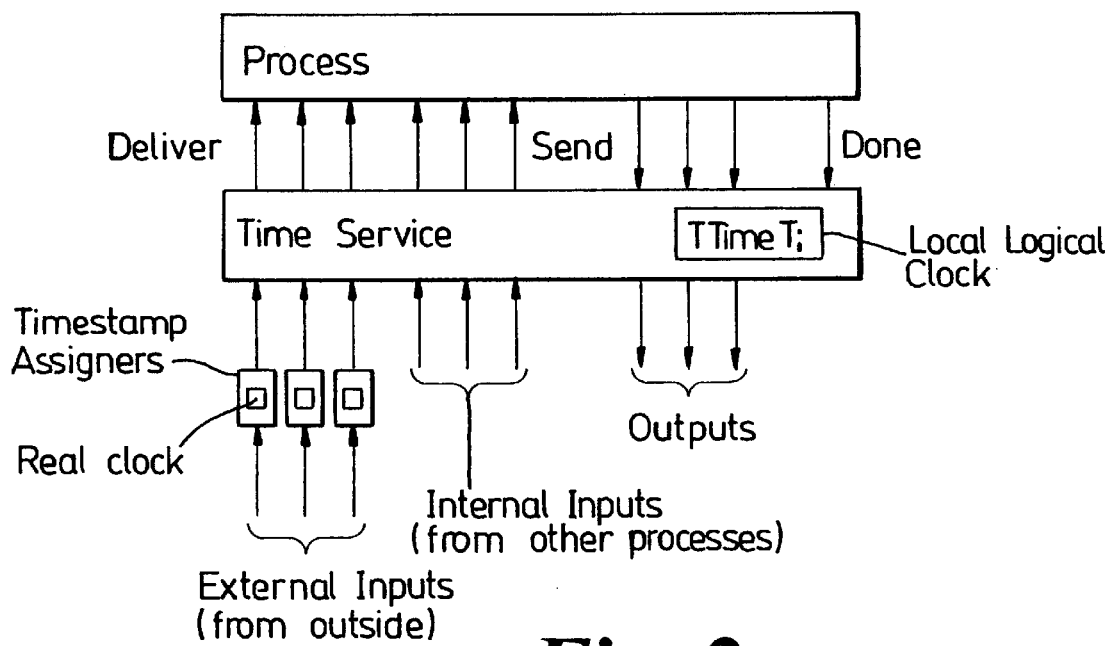
FIG. 2 is a diagram of a process with its time service.

The implementation should use (when possible) dynamic allocation to avoid the arbitrary upper limit on path Each node or message handler invocation in the distributed system is structured as shown in FIG. 2. All functionality related to support for the time model resides in the time service, so that a process does not know anything about the time model. Each time it finishes handling a message it informs its time service (Done signal or event (e) above). The time service has a local clock T of type TTime which is updated whenever a message is received or sent by its process. Initially the local clock has a value given by a default constructor and it is kept and used even while the process is idle.

The "timestamp assigner" at the border with the system's environment has a real clock synchronized with the clocks of all other timestamp assigners, and a unique input identifier. 'Synchronized' here is understood to mean adequately synchronized, for example by means of the network time protocol as described in the Internet Engineering Task Force's Network Working Group's Request for Comments 1305 entitled 'Network Time Protocol (Version 3) Specification, Implementation and Analysis' by David L Mills of the Univ. of Delaware published by the IETF in March 1992. Each time an external message enters the system it gets a unique timestamp constructed from these two values (see the second constructor of TTime). It is assumed that the real clock progresses between each two messages.

Figure 3:
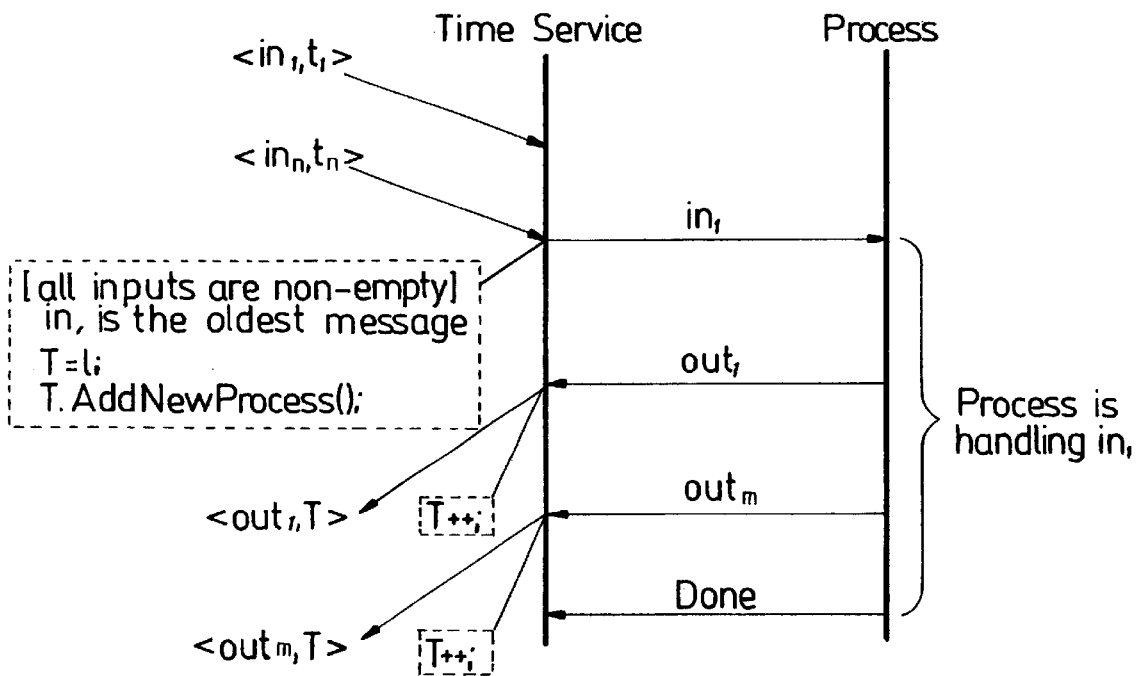
FIG. 3 illustrates a message sequence of the time service.

Input messages are not delivered to the process until there are messages present on all inputs. Once this condition holds, the local clock is set to the timestamp of the most senior message, the new process is added to the path, and the most senior message is delivered. Every output message sent by the process while handling this input is timestamped by the time service with the current value of the local clock; and then the clock is incremented. The next message can be delivered only after the process explicitly notifies the time service that it has finished with the previous one, is idle and waiting (Done). The corresponding message sequence is shown in FIG. 3. The basic algorithm Alg. 1 of the time service is shown in the table below.

| Initial slate: Idle. | |
|---|---|
| Event | Action |
| Slate Idle | |
| Input message arrives | ‖( there are messages on all Inputs) // If all inputs are non-empty, DeliverTheOldesIMessage(); // delivery is possible |
| State Handling Message | |
| Process sends output message | Send it with the timestamp T; T++; //increment the last time in the timestamp |
| Done | ‖( there are messages on all Inputs) { // If all inputs are still non-empty, DeliverTheOldesIMessage(): // deliver the next oldest message return; } Next state = Idle; |
| Functions vold DeilverTheOldesIMessage() { | |

```
    T = timestamp of the oldest message:    // First, the local clock is set to the value of the oldest
    T.AddNewProcess();                       // timestamp, and a new process is added to the path in u
    Deliver( the oldest message):
    Next slate = Handling Message;
}
```

This algorithm ensures that input messages are delivered to each process in the order of their timestamps, and that output messages are sent by each process in the order of their timestamps. Thus, the time service as described above fully implements the time model.

However, a distributed system containing a cycle will not work, as all time services in the cycle will always be missing at least one input message. Also, rare messages, either on an external input or on an internal process-to-process connection, may significantly slow down the whole system.

Channel flushing can solve both these problems. Channel flushing is a mechanism for ensuring that a message can be accepted. The principle is to send auxiliary messages that enable the time service to prove that no message will arrive which is earlier than one awaiting delivery. Hence the waiting message can be delivered.

There are two kinds, namely 'sender channel flushing', in which the sending end initiates channel flushing when the channel has been left unused for too long, and 'receiver channel flushing', in which the receiving end initiates channel flushing when it has an outstanding message that has been awaiting delivery for too long.

Figure 4:
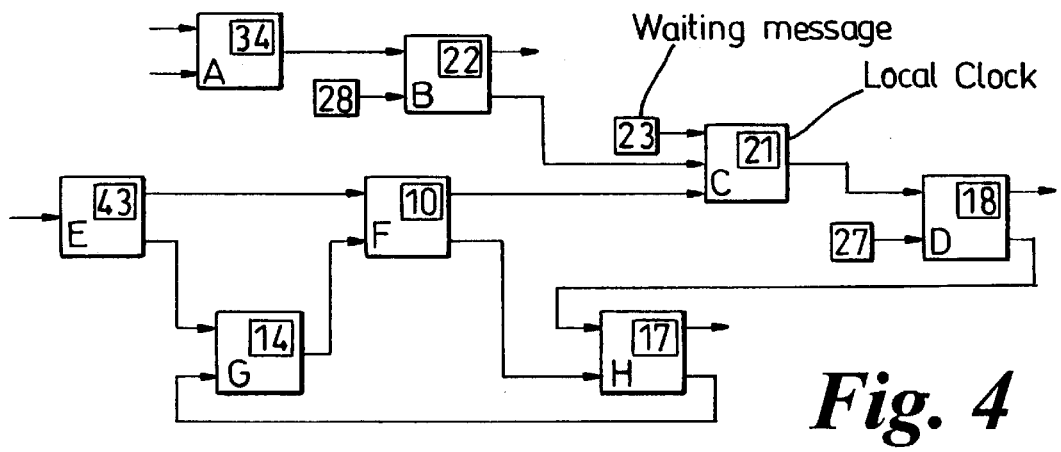
FIG. 4 shows a network of processes, to explain channel flushing.

Receiver channel flushing will be considered first, in conjunction with FIG. 4. For simplicity, timestamps and clocks are represented by single integers.

Suppose for a certain period of time the two lower inputs of the process C are empty while there is a message with timestamp 23 waiting on the upper input. The time service of C wants to deliver the message as soon as possible, but it cannot do so until it proves that those messages that will eventually arrive on the empty inputs will have greater timestamps.

To prove it, C sends a channel flushing request "May I accept a message of time 23?" to B and F, both of which have to forward this request deeply into the system, until either a positive or negative response can be given. In fact, to verify that C can accept the message with the timestamp 23 in FIG. 4, it is enough to ask only the processes shown, since all inputs to the diagram are at times later than 23.

Figure 5:
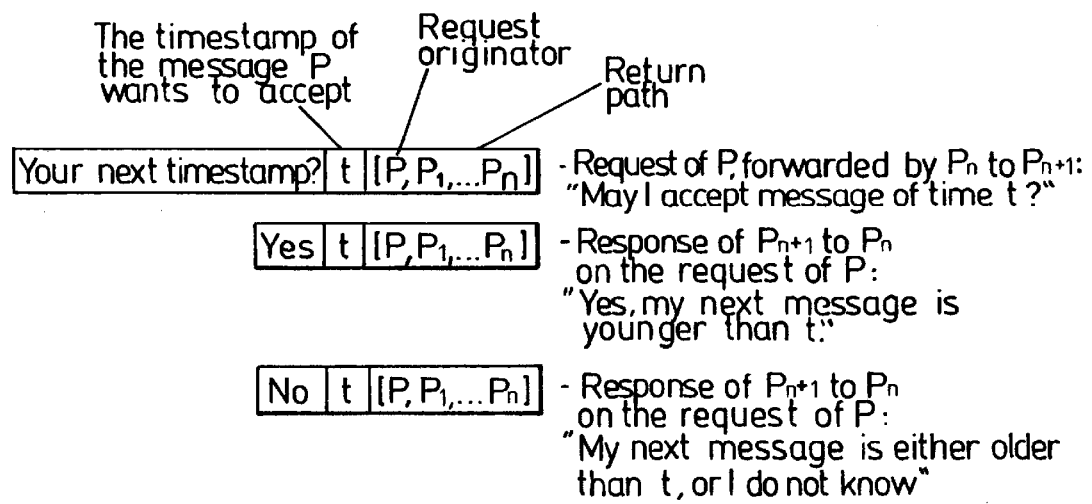
FIG. 5 is a diagram showing channel flushing messages and the structure of time service.
Figure 5:
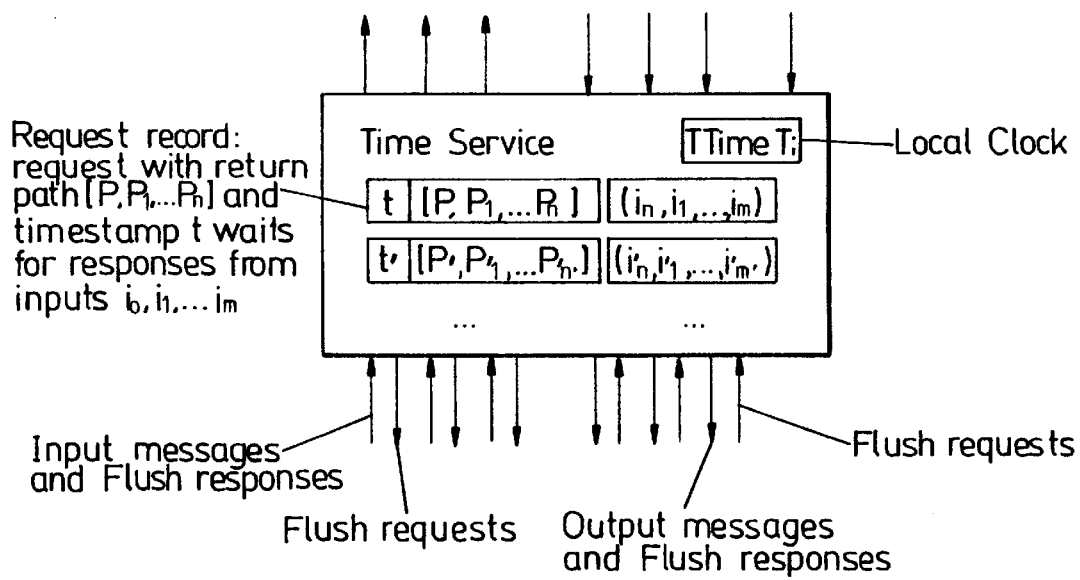

The algorithm described below is a straightforward implementation of channel flushing. All channels in the system (which actually connect the time services of the processes) are bi-directional, since, besides the normal uni-directional messages, the channel flushing messages are sent along them in the reverse direction. These messages and the structure of the time service are shown in FIG. 5.

The general idea is that each time the time service discovers that there are input messages waiting while some inputs are empty, it sets a flush timer. On the timeout event it starts the channel flush. It sends flush requests to all empty inputs, creates a (local) request record with the list of these inputs, and then waits for responses. If positive responses come from all inputs, the oldest message is delivered. If a negative response comes on any input the flush is cleared and re-scheduled.

Requests from other time services are handled in the following way. First, the time service tries to reply using its local information (its local clock and the timestamps of waiting messages). If it is unable to do so, it creates a (remote) request record and forwards the request to all empty inputs. If all responses are positive, so is the one to the remote requester. Otherwise, the response is No.

The algorithm Alg. 2 is presented in a table below. Again, the time service has two states: Idle and Handling Message. While in the latter state, the time service is only serving process output messages, whereas in the Idle state it does all channel flushing work for both itself and other processes. <t, Path, Inputs>represents a request record. [] is an empty path. New, Delete and Find are operations over an array of request records that maintain the local state of the receiver channel flush algorithm. P is the identifier of this process. T is the local clock.

```
Initial slate: Idle, Flush timer not set no request records.
Event                    Action
State Idle
Input message            for( all <I, Path, inputs> ): Path ≠ []) // First update remote requests.
    with time 4              if( I < 4) // Input i is younger than the request's time.
    arrives at input i           YesForRequest ( <t, Path, Inputs>, i );
                             else // Input is older than the request's time.
                                 NoForRequest ( <1, Path, Inputs > );
                         if( there are messages on all Inputs ) ( // Then, if all inputs are non-empty,
                             CancelLocalFlushing();
                             DeliverTheOldestMessage(); // delivery is possible.
                         return:
                         }
                         if( the new message is the oldest one ) { // if this message becomes the
                             CancelLocalFlushing(); // oldest one, a new focal
                             Set flush timer; // flushing must be scheduled.
                             return:
                         }
                         if ( Find( < t, [], Inputs>)) // Otherwise, if there is a local request waiting
                             YesForRequest ( < t, [], Inputs >, 1 ); // for this input, that means Yes.
```

-continued

| | |
|---|---|
| Flush timeout | StartFlusing( timestamp of the oldest message, []); |
| | // Empty return path indicates that the request is local. |
| <Your Next Time?, t, [$P_o...P_n$] > flush request | if( P is among [$P_o...P_n$]‖t<T) ( // If request has made a cycle - assume Yes. |
| |     Send to output to $P_n$: <Yes, t, [$P_o...P_n$]>; // Or, if local clock is already |
| |     return; // ahead of t, definitely Yes. |
| | } |
| | if( there is a message older than t on some input) ( |
| |     Send to $P_n$: < No, t, [$P_o...P_n$]>; // Then assume No. |
| |     return; |
| | } |
| | // This process is not able to answer immediately and it starts flushing. |
| | StartFlushing(t, [$P_o...P_n$]); |
| < Yes, t, [$P_o...P_n$]> +ve response on input i | if( Find( <t, [$P_o...P_n$], Inputs >))     YesForRequest ( <t, [$P_o...P_n$], Inputs >, i) |
| < No, t, [$P_o...P_n$]> negative response | if( Find( <t, [$P_o...P_n$], Inputs > ))     NoForRequest ( < t, [$P_o...P_n$], inputs > ) |

| | |
|---|---|
| Slate Handling message | |
| Process sends output message | Send it with the timestamp T; |
| Done | if( there are messages on all Inputs ) ( // If all inputs are still non-empty. |
| |     DeliverTheOldestMessage(); // deliver the next oldest message. |
| |     return; |
| | } |
| | if( there is a non-empty Input) // Otherwise, if there is a non-empty input, |
| |     Set flush timer; // a new local flushing must be scheduled. |
| | Next state = idle; |
| Functions | |

```
void DeliverTheOldestMessage() {
  T = maximum(T, timestamp of the oldest message); // Before delivery, the local clock is set
  T.AddNewProcess(); // to the value of the oldest timestamp, and
  Deliver( the oldest message); // a new process is added to the path in this value.
  Next state = Handling Message;
}
void CancelLocalFlushing() { // Cancelling local flushing activity includes
  Cancel flush timer; // cancelling the flush timer (just in case it is set)
  if( Find( <t, [], inputs > )} // and deletion of a local request record (if any).
     Delete( <t, [], Inputs > );
}
void StartFlushing( TTime I, TPath path){ // Flushing upon local or remote request starts with
  for(all empty inputs) // sending requests to all empty inputs
     Send to input: < Your next time?, t, Path+P >, // (P is added to the return path)
  New( <t, Path, Set of empty inputs > ); // and creation of a new request record.
}
void YesForRequest ( TRecord < t, Path, Inputs >, Tinput [) { // On positive response on input i
  if( i g inputs ) // If the record has already received this
     return; // information then it doesn't care.
  Inputs = Inputs \ i; // The input is removed from the Inputs set of the request record.
  if ( Inputs == ∅) { // If this set becomes empty, no more responses are needed.
     Delete( < I, Path, Inputs > );
     if( Path == []) // and if it is a local request
        DeliverTheOldestMessage(); // the oldest message is delivered.
        // Successful channel flushing.
     else // Otherwise it is a remote request.
        Send to the last process in the Path: < Yes, t, Path >; // Yes is sent to the next process
  } // in the return path.
}
void NoForRequest( TRecord < t, Path, Inputs > ) { // Negative response - acted on immediately.
  Delete( < 1, Path, Inputs > ); // The corresponding record is deleted.
  if (Path == []) // If it is a local request
     // Unsuccessful channel flushing
     Set flush timer; // then restart the flush timer,
  else // Otherwise, for a remote request.
     Send to the last process in the Path: < No, t, Path >; // No is sent to the next process
} // in the return path.
```

Figure 6:
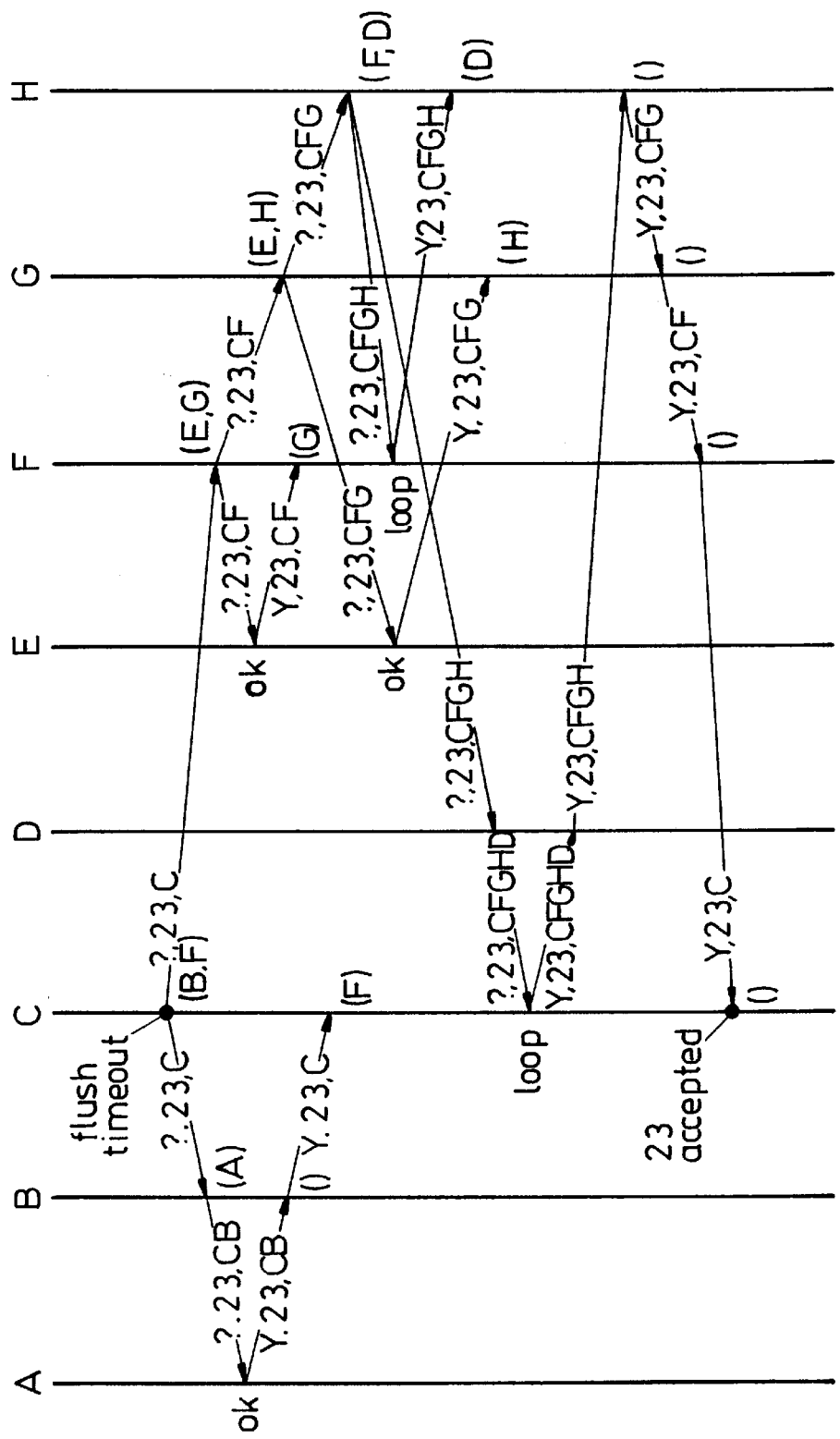
FIG. 6 illustrates a message sequence of channel flushing.

To illustrate the work of the algorithm, consider the example in FIG. 4 in conjunction with one possible channel flushing message sequence as shown in FIG. 6. "?" denotes here "Your Next Time?", "Y" stands for Yes, and "N" for No. Sets near the vertical axes represent the sets of processes from which responses are still wanted (Inputs in the above terminology). "ok" means that a process is sure it will not be sending anything older than the timestamp of the request, (i.e. 23). "loop" means that a process has found itself in the return path of the request.

It is evident that the channel flushing procedure consists of two waves: a fanning out request wave and a fanning in response wave. The request wave turns back and becomes the response wave as soon as the information needed for the initial request is found.

The "timestamp assigner" at the border with the environment treats the channel flushing request in the following way.

to any of the input channels, the bus outputs an identical message on each of its output channels in order. The time service computes the timestamp for these in the normal way, as shown.

A bus acts as a message sequencer, ensuring that all recipients of a series of multicasts receive the messages in the same order (as shown).

The Delay

In a non-distributed system it may be possible to set a timer, and then have an event handler that is invoked when the timer runs out. This alarm can be seen as a spontaneous event. Within the time model, it must be ensured that spontaneous events have a unique time. The simplest way of achieving this is to treat spontaneous events just like external events. A timestamp is allocated to them using a real RealClock() returns the real clock reading; Input is the unique external input identifier.
Event                              Action
External input message arrives     Send it with the timestamp TTime( RealClock(), Input):
< Your Next Time7, t, $(P_o...P_n)$>  if( t < (TTime( RealClock(), Input )) // lft is older than local time
  flush request                       Send < Yes, t, $(P_o...P_n)$>; // Then definitely Yes
                                    else
                                      Send < No, t, $(P_o...P_n)$>; // Otherwise assume No Sender channel flushing is conceptually simpler, and significantly more efficient than receiver channel flushing, although it does not provide a solution to the loop problem.

In sender channel flushing, each output channel of each process has a timeout associated with it. This timeout is reset each time a message is sent down the channel. The timeout can be either a logical timeout (i.e. triggered by some incoming message with a sufficiently later timestamp) or a physical timeout. If the timeout expires before being reset then a sender channel flush is initiated down that channel. The channel flush consists of a 'non-message' which is sent down the output channel. The receiver can use it to advance the time of the channel by allowing the time service to accept earlier messages waiting on other channels. When the non-message is the next message to be accepted, then the time service simply discards it. However, the non-message, by advancing the receiver's local clock, can cause logical timeouts on output channels of the receiver; hence causing a cascading sender channel flush.

The timestamp assigners also participate in sender channel flush; they have to use a physical timeout. In general, using both sender and receiver channel flushes is recommended; preferably with some sender channel flushes piggy backed upon receiver channel flush response messages.

To provide usable middleware implementing the time model it is necessary to relax some of the more restrictive assumptions about the system being built. Three special processes that need to be created and integrated with such middleware are now considered, as is a full treatment of loops in the dataflow.

The Bus

The bus is a process that allows multiple output ports from any number of processes to be connected to multiple input ports on other processes. The term 'bus' is taken from Harrison (A Novel Approach to Event Correlation, Hewlett-Packard Laboratories Report No. HPL-94–68 Bristol UK 1994) and is intended to convey the multiple access feature of a hardware bus.

Figure 7:
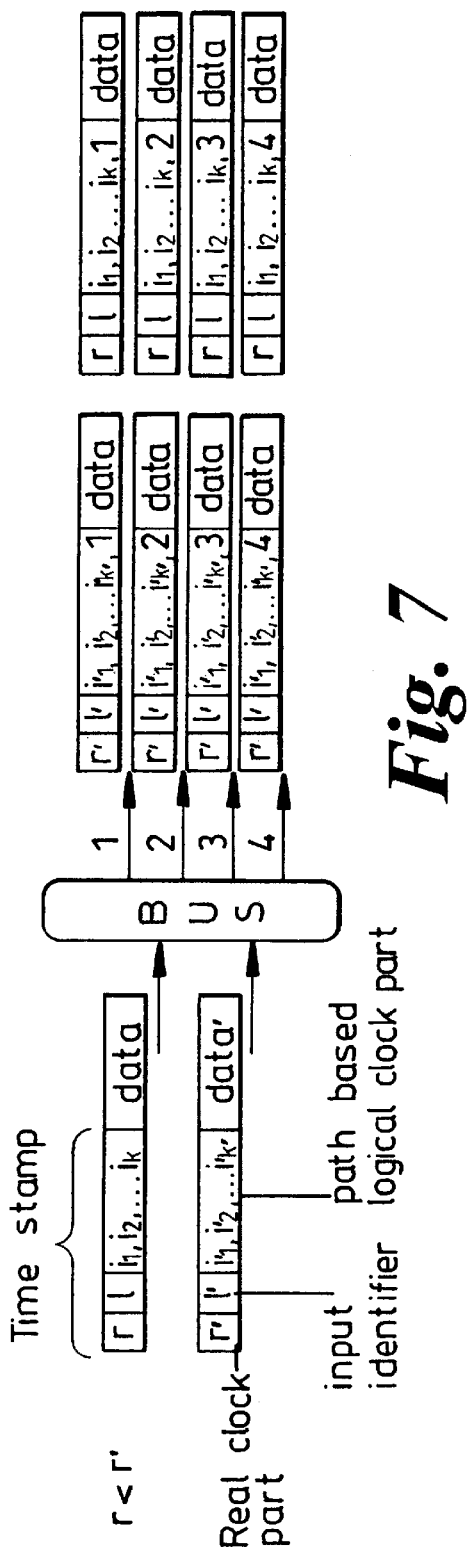
FIG. 7 shows a bus.

The bus implements a multicast as a sequence of unicasts, its operation being shown in FIG. 7.

Figure 8:
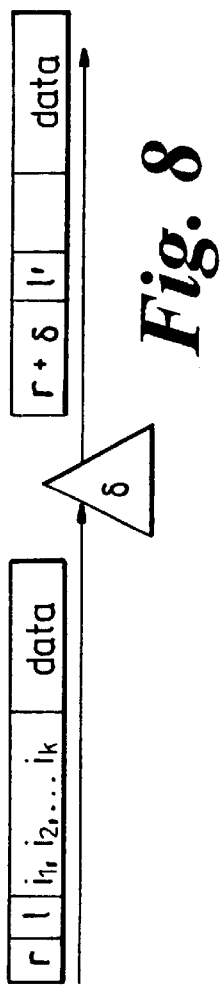
FIG. 8 shows a delay.

The output channels are ordered, (shown in the diagram as 1 2, 3, 4). When a message is delivered by the time service clock and a unique input identifier. Moreover, a process can schedule itself a spontaneous event at some future time which again will get a timestamp with real part coming from the scheduled time. Having thus enabled the scheduling of future events the delay component can be created as schematically shown in FIG. 8.

For each input message the delay generates an output message at some constant amount of time, $\delta$, later. The time of the generated message is given by the sum of $\delta$ and the first time in the timestamp (the real time part). The rest of the path part of the timestamp is ignored. The input identifier part of the timestamp is changed from the original, 1, to the input identifier of the delay, 1'. There are large efficiency gains from fully integrating delays with the receiver and sender channel flush algorithms. The responses to flush requests should take the length of the delay into account, as should any relaying of flush requests through the delay.

The Plumber

The plumber (the topology manager) is a special process that manages the creation and destruction of channels and processes. The plumber has two connections with every process in the system. The first is for the process to make topology change requests to the plumber; the second is for the plumber to notify the process of topology changes that affect it (i.e. new channels created or old channels deleted). The plumber can create and delete processes that have no channels attached. The plumber has a specific minimum delay between receiving a topology change request and doing it. This is the key to a feasible solution to topology changes within this time model. The reason that topology changes are difficult for (pessimistic implementations of) the proposed time model is that for a process to be able to accept a message it must know that it is the oldest message that will arrive. If the topology is unknown then all other processes within the application must be asked if they might send an older message. This is implausible. The plumber acts as the single point one needs to ask about topology changes. Moreover, the minimum delay between the request for a topology change and its realisation ensures that the plumber does not need to ask backward to all other processes. For large systems, or for fault tolerance, multiple plumbers are needed, and these can be arranged hierarchically or in a peer-to-peer fashion. As with the delay process the plumber needs to be integrated with the channel flush algorithms.

Loops

Loops generate issues for the time model and typical loops generate a need for many auxiliary messages. A loop without a delay can only permit the processing of a single message at any one time anywhere within the loop (it is said that the loop "locksteps"). Three solutions to these problems are examined.

Removing Loops

The traditional design models, client/server, master/slave, encourage a control driven view of a distributed system, which leads to loops. A more data driven view of a system, like the data flow diagrams encouraged in structure analysis, is typically less loopy.

Figure 9:
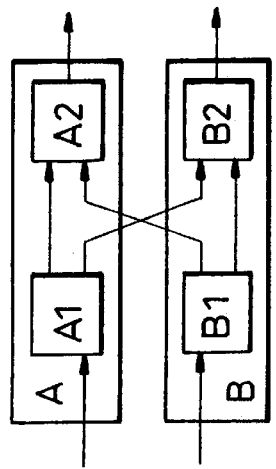
FIG. 9 shows a false loop, and FIG. 10 comprises diagrams of feedback through a bus.

Moreover, where a first cut has loops, a more detailed analysis of a distributed system may show that these loops are spurious. The data-flows, rather than feeding into one another, feed from one submodule to another and then out. For example, in FIG. 9, there is an apparent loop between process A and process B, (a flow from A feeds into B which feeds back into A). But when one looks at the sub-processes A1, A2, B1, B2 there are, in fact, no loops, only flows.

Co-locate the Processes in a Loop

It there is a loop for which other solutions are not appropriate, it will be found that only one process within the loop can be operational at any one time. It will normally be better to have this, and put all the processes in the loop on the same processor. There will be no penalty in terms of loss of parallelism. This approach will minimise the cost of the auxiliary messages, because they will now be local messages.

Break the Loop Using a Delay

Informally, the problem with a loop is feedback. Feedback happens when an input message to a process strongly causes another message (the feedback) to arrive later at the same process. Under the strong causality axiom, feedback is strongly caused by the original messages, and hence comes before all subsequent messages. Hence any process in a loop must, after processing every message, first ascertain whether there is any feedback, before proceeding to deal with any other input. A delay process is a restricted relaxation of strong causality, since each input to the delay does not strongly cause the output, but rather schedules the output to happen later. Hence, if there is a delay within the loop, then a process can know that any feedback will not arrive until after the duration of the delay. Hence it can accept other messages arriving before the feedback.

A Difficult Case

Figure 10:
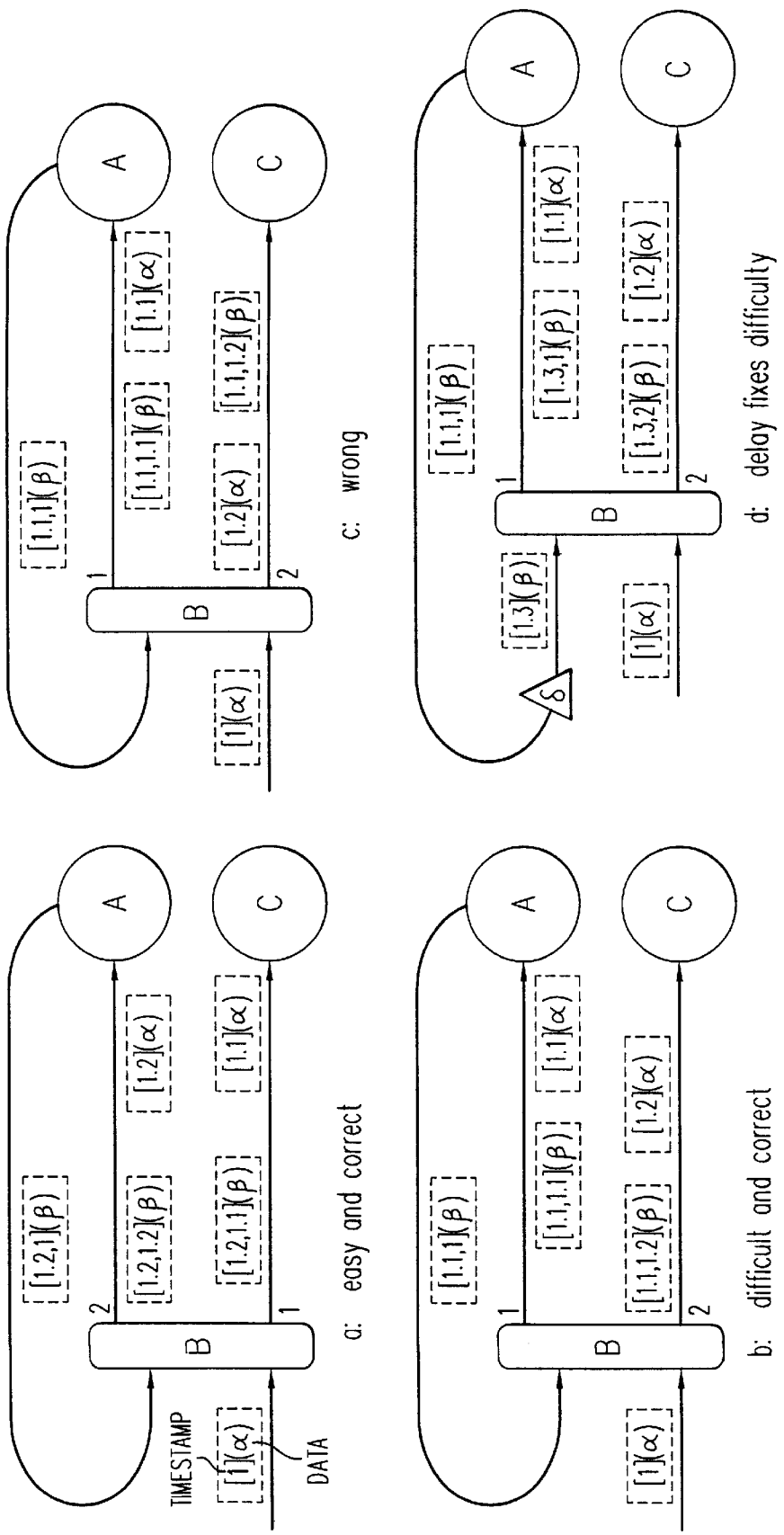

The example in FIG. 10 presents specific problems of both semantics and implementation for feedback.

In each of the four cases we see a message with data a arriving at a bus B and being multicast to processes A and C. A responds to the message a by outputting a message with data β which is fed back into the bus, and hence multicast to A and C. When it arrives at A no further feedback is produced. If the bus sends to C before A (FIG. 10a) then no issues arise: the original message is multicast to both parties, and then the feedback happens and is multicast.

If, on the other hand, the bus sends to A before C then he feedback happens before the original message is sent to C. The order in which C sees the feedback and the original message is reversed (FIG. 1b). This indicates that strong causality and feedback require a re-entrant processing similar to recursive function calls. Such re-entrant processing breaks the atomicity of invocations and also needs significantly more channel flushing messages than the non-re-entrant algorithm that has been presented. The simplest form algorithm Alg. 1 would incorrectly output the later message from B to C before the earlier message (FIG. 10c). Without re-entrant processing there is a conflict between strong causality and the sent after relation. The later version algorithm Alg. 2, refines the DeliverTheoldestMessage function to ensure that all incoming messages are delayed (with the minimum necessary delay) until after the previous output (FIG. 10d). This implementation obeys the time model, but (silently) prohibits non-delayed feedbacks. At the theoretical level this obviates the necessity for re-entrancy and prefers the sent after relation to strong causality. At the engineering level, this can be seen as a compromise between the ideal of the time model and channel flushing costs.

A slight more exhaustive account of the above is given in the priority documents accompanying this Application.

What is claimed is:

1. A complex computing system comprising:
   a plurality of nodes connected to each other by channels along which time stamped data messages are sent and received, each timestamp being indicative, generation by generation, of its seniority acquired through its ancestors' arrival in the system and in any upstream nodezs, and each node including:
   means for storing each input data message,
   means for determining the seniority of input data messages by progressive comparison of respective generations in the timestamups until a first distinction exists,
   means for delivering the input data messages for processing,
   means for applying a timestamp to each output message derived from such processing comprising an immediately ancestral message's timestamp augmented by a new generation seniority indicator consistent with the ordering, and
   means for outputting such ordered and timestamped messages.

2. A complex computing system as claimed in claim 1, wherein the means for delivering is arranged to deliver messages in order according to which message has the most senior timestamp indicator.

3. A complex computing system as claimed in claim 1, wherein for a data message received from outside the system, an initial timestamp indicator includes an indication of a time of receipt of said data message at the node.

4. A complex computing system as claimed in claim 1, wherein for a data message generated by a node of the system, a new generation seniority indicator of the timestamp includes an indication of the place of said data message in the ordered sequence of such messages at said node.

5. A complex computing system as claimed in claim 1, wherein monotonic integers are utilized as said generation seniority indicators in the timestamps.

6. A complex computing system as claimed in claim 1, wherein the means for delivering of a node delivers data messages only once a message has been received on each input channel of said node.

7. A complex computing system as claimed in claim 1, wherein the means for delivering of a node delivers data messages only when at least one data message received on each input channel of said node is stored in the storage means.

8. A complex computing system as claimed in claim 6, wherein each node is adapted to perform at least one channel flushing routine triggerable by lack or paucity of channel traffic.

9. A complex computing system as claimed in claim 1, wherein all data messages caused by a first data message anywhere in the system are delivered to a node before any messages caused by a second data message, junior to the first data message, are delivered to said node.

10. A method of ordering data messages within a complex computing system comprising a plurality of nodes connected to each other by channels along which data messages are sent and received, the method comprising, for each node, timestamping each message on arrival, queuing messages until a message has been received on each input channel to the node, and delivering the queued messages for processing sequentially in accordance with their timestamps, the message having a most senior timestamp being delivered first, wherein timestamping at each node is cumulative so that a timestamp of a particular message indicates a seniority acquired by that message, generation by generation, and wherein the seniority of one message against another is determined by a progressive comparison of respective generations in the timestamps until a first distinction exists.

11. A complex computing system as claimed in claim 1, wherein the system is either a distributed computing system, a symmetric multi-processor computer, or a massively parallel processor computer.

* * * * *

UNITED STATES PATENT AND TRADEMARK OFFICE
CERTIFICATE OF CORRECTION

PATENT NO. : 6,327,630 B1
DATED : December 4, 2001
INVENTOR(S) : Carroll et al.

It is certified that error appears in the above-identified patent and that said Letters Patent is hereby corrected as shown below:

<u>Title page, Item [54] and Column 1, lines 1-2,</u>
Change the title from "ORDERED MESSAGE RECEPTION IN A DISTRIBUTED DATA PROCESSING SYSTEM" to -- COMPLEX COMPUTING SYSTEM --.

Item [75], change address of Jeremy John Carroll from "Leghorn, IT" to -- Livorno, IT --

<u>Column 14,</u>
Change the wording in claim 1, line 24 from "nodezs, and each node including:"
to -- nodes, and each node including: --
Change the wording in claim 1, line 28 from "generations in the timestamups until a first distinction" to -- generations in the timestamps until a first distinction --.

Signed and Sealed this

Ninth Day of July, 2002

*Attest:*

*Attesting Officer*

JAMES E. ROGAN
*Director of the United States Patent and Trademark Office*